Patented Jan. 24, 1933

1,895,329

UNITED STATES PATENT OFFICE

WLADIMIR IPATIEFF, OF BERLIN-WILMERSDORF, AND CARL FREITAG, OF BERLIN-NEUKOLLN, GERMANY

PROCESS OF PRODUCING PHOSPHORIC ACID AND HYDROGEN

No Drawing. Application filed February 27, 1930, Serial No. 431,971, and in Germany February 28, 1929.

This process relates to the oxidation of phosphorus, phosphine or low oxidation products of the phosphorus with water under pressure at increased temperatures below 600° C., metals or compounds from the first and eighth group of the periodic system of the element being added to the initial substances for the catalytic acceleration of the reaction, said metals being therein soluble at the beginning or temporarily and undergoing reactions in the course of the process under practically complete precipitation of the metallic constituent.

The conversion of phosphorus, phosphine or low oxidation products of the phosphorus with water under pressure and in the presence of catalysts, which by the reaction participants are not or scarcely acted upon, is known. It is further known, that good catalysts are produced, if, i. e. as walls of the reaction space, substances—preferably metals—are introduced, which first participate in the reaction, supply however in the further course combinations, which are proof against the action of the participants in the reaction.

When working according to this process, phosphorous acid and phosphoretted hydrogen are first produced, which at premature cessation of the reaction pollute in large quantity the phosphoric acid and the hydrogen. Only after sufficiently long reaction period the complete conversion to phosphoric acid and hydrogen takes place.

According to the invention it is possible, besides to obtain a much greater reaction acceleration than with the hitherto employed catalysts, to reduce the production of phosphorous acid and of phosphoretted hydrogen in such a measure that, also at premature cessation of the reaction, only traces of these intermediate combinations are contained in the reaction products, even if not yet converted elementary phosphorus is present. This special catalytic effect is obtained, if the oxidation of the phosphorus with water under pressure is carried through in the presence of substances which, at the beginning or temporarily, are absorbed by the reaction participants, preferably in dissolving, being however precipitated again in the course of the reaction in any form totally or for the greatest part. Decomposable combinations of metals are in question for this purpose, which are precipitated by the hydrogen or by one of the reaction participants as metal, basic combination, phosphide, phosphate or the like, or by an according simple subsequent treatment. Salts and oxides of the copper, silver, iron, nickel (generally of the metals of the first and eighth group of the periodic system) have proved to be suitable, and also the metals themselves. The anion of the salts must be chosen so that no corrosion of the material of the vessel or of the lining of the walls of the reaction chamber occurs, whereas a surface action is often favorable. In silver vessels for instance chlorides, sulphates and other, but also nitrates may be used, as the nitric acid, which is liberated first, is decomposed completely to elementary nitrogen or to ammonia. Decisive are the conditions of the reaction. It is for example possible to work with nickel lined reaction chambers, if care is taken, that the hydrogen pressure never decreases to beyond a critical height corresponding to the temperature. The influence of the anion on the catalysts' activity is not yet explained. Nitrates and oxides are better than chlorides and sulphates. The latter are preferably employed under conditions, which do not result in formation of sulphuretted hydrogen. When oxides or metals themselves are used, a temporary solution must be supposed, as the precipitates correspond absolutely to those obtained from salts.

A characteristic feature of this process is, that the catalytically acting metals or combinations from the substances which have been introduced at the beginning or temporarily dissolved are precipitated in more or less fine distribution, mostly crystallized, and therefore practically do not pollute the reaction products for their purpose after filtration or decantation, and—as far as they are valuable, can be recuperated almost completely. The process can be sometimes so conducted that the precipitated metal adheres on the walls. The increased catalytic action in comparison with other known processes is apparently the fine distribution of the catalytic substances and the positive self-formation of the catalytic combinations. Also the formation reaction of the catalyst has evidently a decisive importance and is the reason for the differences of the effect of different anions when the cation remains the same.

A form of carrying out the process is characterized in that in a separate stage of the process a catalytically acting precipitate is separately represented by action of only one or several of the participants in the reaction of the oxidation process upon the initial substance; for example intermediate reaction of the phosphorus oxidation process is made to take place simultaneously with the formation reaction of the catalyst. Another form of the process is characterized by the separated utilization of catalyst precipitate obtained. The process may be conducted the first time under different conditions in order to obtain an effective contact, or the solution or suspension of the initial substance may be exposed to the action of only a portion or of only a single one of the reaction participants.

In the case the anion is destroyed by the process, it can be added again in the form of acid or salt to the precipitates when used again.

Examples

1. According to our prior application Ser. No. 343,572 dated 28th of February, 1929, 1 part of phosphorus with 3 parts of water containing 3 percent by weight of sulphate or chloride of copper dissolved is exposed under pressure to increased temperature. In opposition to the application of pure water, hydrogen free from phosphine is immediately obtained, the general reaction speed being higher, and the phosphoric acid contains merely traces of phosphorous acid, even if elementary phosphorus is still present. The copper is as copper phosphide quantitative in precipitation eventually admixed with elementary phosphorus.

2. When nitrate of nickel is used (for example $1 \times 10P \times 30H_2O$); instead of the copper salt in the above example, the catalytic effect is even more surprising. The process can then be carried out already at 200° C. with a rapidity which, without catalyst, corresponds to a temperature more than 100° C. higher. The nickel is apparently precipitated as crystallized metal, whereas the nitric acid is reduced partly to elementary nitrogen, partly to ammonia. The loss of nitrogen remains lower than 1% of the oxidized phosphorus.

We claim:

1. The process for the oxidation of phosphorus, phosphine, and low oxidation products of phosphorus with water at superatmospheric pressures and temperatures, which consists in adding to the initial substances soluble compounds of metals of the first and eighth group of the periodic system to catalyze the reaction and form catalytically active precipitates by control of pressure and temperature, said precipitates being used as catalysts for further conversions.

2. The process for the oxidation of phosphorus, phosphine, and low oxidation products of phosphorus with water at superatmospheric pressures and temperatures, which consists in adding to the initial substances nitrates of metals of the first and eighth group of the periodic system to catalyze the reaction and form catalytically active precipitates by control of pressure and temperature, said precipitates being used as catalysts for further conversions.

In testimony whereof we affix our signatures.

WLADIMIR IPATIEFF.
CARL FREITAG.